(12) United States Patent
Heilmann et al.

(10) Patent No.: US 8,749,429 B2
(45) Date of Patent: Jun. 10, 2014

(54) METHOD FOR DETECTING LOSS OF SENSITIVITY OF AN FMCW RADAR LOCATING DEVICE BY DIFFUSE SOURCES OF LOSS

(75) Inventors: Stefan Heilmann, Vaihingen/Enz (DE); Goetz Kuehnle, Hemmingen (DE); Dirk Bechler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 462 days.

(21) Appl. No.: 13/202,292

(22) PCT Filed: Dec. 28, 2009

(86) PCT No.: PCT/EP2009/067942
§ 371 (c)(1),
(2), (4) Date: Oct. 27, 2011

(87) PCT Pub. No.: WO2010/097137
PCT Pub. Date: Sep. 2, 2010

(65) Prior Publication Data
US 2012/0032838 A1 Feb. 9, 2012

(30) Foreign Application Priority Data
Feb. 27, 2009 (DE) .......................... 10 2009 001 239

(51) Int. Cl.
*G01S 13/95* (2006.01)
*G01S 13/93* (2006.01)
(52) U.S. Cl.
CPC .............. *G01S 13/931* (2013.01); *G01S 13/95* (2013.01)
USPC ............. 342/26 R; 342/26 D; 342/70; 342/82

(58) Field of Classification Search
CPC ... G01S 13/931; G01S 13/345; G01S 7/4004; G01S 13/282; G01S 13/95; G01S 7/41; G01S 13/34; H01Q 1/3233
USPC ...... 342/70–72, 82, 26 R, 26 D, 128; 340/602
See application file for complete search history.

(56) References Cited

U.S. PATENT DOCUMENTS 4,404,562 A * 9/1983 Kretschmer et al. .......... 342/194
6,404,381 B1 6/2002 Heide et al.
(Continued)

FOREIGN PATENT DOCUMENTS

DE 19803660 8/1999
DE 19945268 3/2001
(Continued)

OTHER PUBLICATIONS

International Search Report, PCT International Patent Application No. PCT/EP2009/067942, dated Apr. 20, 2010.

*Primary Examiner* — John B Sotomayor
(74) *Attorney, Agent, or Firm* — Kenyon & Kenyon LLP

(57) ABSTRACT

A method for the detection of sensitivity losses of an FMCW radar locating device due to diffuse sources of loss, in which the radar locating device emits a transmit signal whose frequency is periodically modulated in successive modulation ramps, and at least one power characteristic of at least one frequency portion of a signal received by the radar locating device is evaluated, wherein the power of the transmit signal is varied cyclically, in each case after the completion of a modulation ramp, and the sensitivity losses are determined on the basis of differences in the power characteristics of signals received during successive modulation ramps having identical modulation.

8 Claims, 6 Drawing Sheets

(56) References Cited

U.S. PATENT DOCUMENTS

| | | | |
|---|---|---|---|
| 8,390,507 B2 * | 3/2013 | Wintermantel | 342/70 |
| 8,436,763 B2 * | 5/2013 | Wintermantel | 342/70 |
| 8,581,774 B2 * | 11/2013 | Heilmann et al. | 342/26 R |
| 2008/0024353 A1 | 1/2008 | Schneider | |
| 2010/0309041 A1 | 12/2010 | Hassen | |
| 2011/0298656 A1 * | 12/2011 | Bechler | 342/26 R |
| 2012/0032838 A1 * | 2/2012 | Heilmann et al. | 342/192 |
| 2012/0032840 A1 * | 2/2012 | Heilmann et al. | 342/26 R |
| 2012/0050093 A1 * | 3/2012 | Heilmann et al. | 342/173 |

FOREIGN PATENT DOCUMENTS

| | | |
|---|---|---|
| DE | 102006054320 | 5/2008 |
| DE | 102008002220 | 12/2009 |
| DE | 102009001239 A1 * | 9/2010 |
| EP | 2401632 B1 * | 6/2013 |
| EP | 2226639 B1 * | 10/2013 |
| JP | 10048333 | 2/1998 |
| WO | WO 2005062072 | 7/2005 |
| WO | WO 2010097137 A1 * | 9/2010 |

* cited by examiner

METHOD FOR DETECTING LOSS OF SENSITIVITY OF AN FMCW RADAR LOCATING DEVICE BY DIFFUSE SOURCES OF LOSS

FIELD OF THE INVENTION

The present invention relates to a method for detecting losses of sensitivity of an FMCW radar locating device by diffuse sources of loss, in which the radar locating device emits a transmit signal whose frequency is periodically modulated in successive modulation ramps, and at least one power characteristic of at least one frequency portion of a signal received by the radar locating device is evaluated.

BACKGROUND INFORMATION

FMCW radar locating devices are frequently used in driver assistance systems for motor vehicles, for example for automatic distance control or for early recognition of the risk of a collision. A radome that covers the antenna and is mostly formed by a radar lens is exposed to a particularly high degree to weather influences and street dirt, so that a reflective dielectric coating (a film of dirt or water) that causes losses can easily form on the surface of the radome.

This significantly reduces the transmit and receive power of the radar sensor, so that detection depth and reliability are significantly limited, up to the complete blinding of the radar sensor. For example, at a radar frequency of 76.5 GHz, a film of water on the radome having a thickness of 0.3 millimeters already has the result that approximately 50% of the radiated power is reflected by this water film, and approximately 90% of the rest of the power is attenuated by absorption.

A coating on the radome is therefore an example of a "diffuse source of loss" that can significantly impair the sensitivity of the radar locating system.

A further example of a diffuse source of loss is precipitation in the form of rain, spray, snow, or hail that reflects a part of the emitted radar radiation and thus causes a reduction in the range of the radar radiation, thus causing a reduction in the locating depth of the radar sensor.

For reasons of traffic safety, it is essential to determine a blinding or limitation of the function of the radar locating device as quickly as possible.

German Patent Application No. DE 199 45 268 A1 describes a method in which a blinding of the radar locating device is to be determined by monitoring a multiplicity of criteria. One of the criteria is based on an evaluation of the average power of the signals received by the radar locating device. However, a disadvantage of this method is that the average power is a function not only of the presence of diffuse sources of loss, but also of a large number of other factors, including, among others, specific properties of the respective radar sensor, assembly and installation tolerances of the radar sensor when installed in the motor vehicle, and in particular influences of temperature and aging.

German Patent Application No. DE 10 2006 054 320 A1 describes a method for detecting precipitation that is also based on the evaluation of a power characteristic of the received radar signal, and is briefly explained below.

The principle of operation of an FMCW (Frequency Modulated Continuous Wave) radar locating device is that the radar signal is continuously sent out, but the frequency of this signal is periodically modulated with rising and falling ramps (here, the term "ramp" is not intended to mean that the frequency modulation within the "ramp" has to be linear). The mixer mixes a part of the transmit signal with the signal received by the antenna and thus creates a mixed product whose frequency corresponds to the difference between the frequency of the current transmit signal and the frequency of the received signal.

When a radar echo is received from a located object, the frequency of the mixed product is a function of the signal runtime and thus of the distance from the object, but, due to the Doppler effect, it is also a function of the relative speed of the reflecting object. Every located object is thus distinguished in the spectrum in which the mixed product is formed on each modulation ramp as a peak situated at the frequency that is a function of the distance and the relative speed. By comparing the frequency positions of peaks originating from the same object on modulation ramps having differing slope, the distance and relative speed of the object can then be determined.

Raindrops or spray are also, in this sense, "objects" that cause a weak but still detectable peak in the spectrum when they are not too far from the radar sensor, for example at distances up to approximately 10-50 m. When there is greater precipitation, these peaks are added together in the frequency range that corresponds to the above-named distance range (the relative speed of the raindrops in the radio direction at elevation 0° can mostly be disregarded) to form a background signal, the so-called rain clutter. The power of this rain clutter is thus a measure of the presence and strength of precipitation.

If, however, "real" objects, such as vehicles driving in front, are also located in the location range of the radar sensor, causing a significantly more pronounced peak in the spectrum, the power in this peak must be left out of account in the evaluation of the power of the rain clutter.

If, however, a large number of real objects are located at different distances, as can happen for example when traveling in alleys or tunnels, or when traveling directly alongside a truck, the corresponding object peaks are distributed so tightly in the spectrum that the detection threshold is raised, with the consequence that it is no longer possible to reliably distinguish between the objects and the rain clutter. In addition, the effectiveness of this method is limited by disturbing factors such as installation tolerances, temperature, and aging.

SUMMARY

An object of the present invention is to provide a method for detecting diffuse sources of loss that is more robust against such disturbing influences.

According to an example embodiment of the present invention, the power of the transmit signal is varied cyclically, after the completion of each modulation ramp, and the sensitivity losses are determined on the basis of differences in the power characteristics of signals received at successive modulation ramps.

If the power of the transmit signal is varied, a corresponding decrease in the power of the received signal will in general also be noted. However, it turns out that the diffuse sources of loss not only influence the absolute power of the received signal, but also affect the manner in which the power of the received signal reacts to changes in the transmit power. In general, the reactions of the received signal to changes in the transmit power are less susceptible to the above-named disturbing influences than the absolute changes in the power characteristics themselves.

The selection and precise definition of the specific power characteristics used for the evaluation according to the method of the present invention is a function of the type of diffuse source of loss that is to be detected in each case.

The example method according to the present invention enables, both in the detection of a coating on a radome and in the detection of precipitation, less sensitivity to influences of temperature and aging as well as to influences of installation tolerances and the location of installation of the sensor, and of specific characteristics of the sensor used, so that overall an improved robustness and suitability for volume production are achieved. In the detection of precipitation, in addition, a greater robustness of the method is achieved in scenarios in which there is a high density of objects.

In a specific embodiment that is particularly suitable for detecting a coating on a radome, the power characteristics that are examined for their reaction to changes in the transmit power are the signal power, i.e., the power of the radar echo produced by located objects, the noise power, i.e., the average power of the noise background, and in particular the ratio between these two power levels.

In another specific embodiment that is particularly suitable for detecting precipitation, the examined power characteristic is the signal power (more specifically, the power maximum of the object peak); in particular, the variance of the signal conduction difference caused by the change in the transmit power is examined.

BRIEF DESCRIPTION OF THE DRAWINGS

Exemplary embodiments of the present invention are shown in the figures and are explained in more detail below.

DETAILED DESCRIPTION OF EXAMPLE EMBODIMENTS

Figure 1:
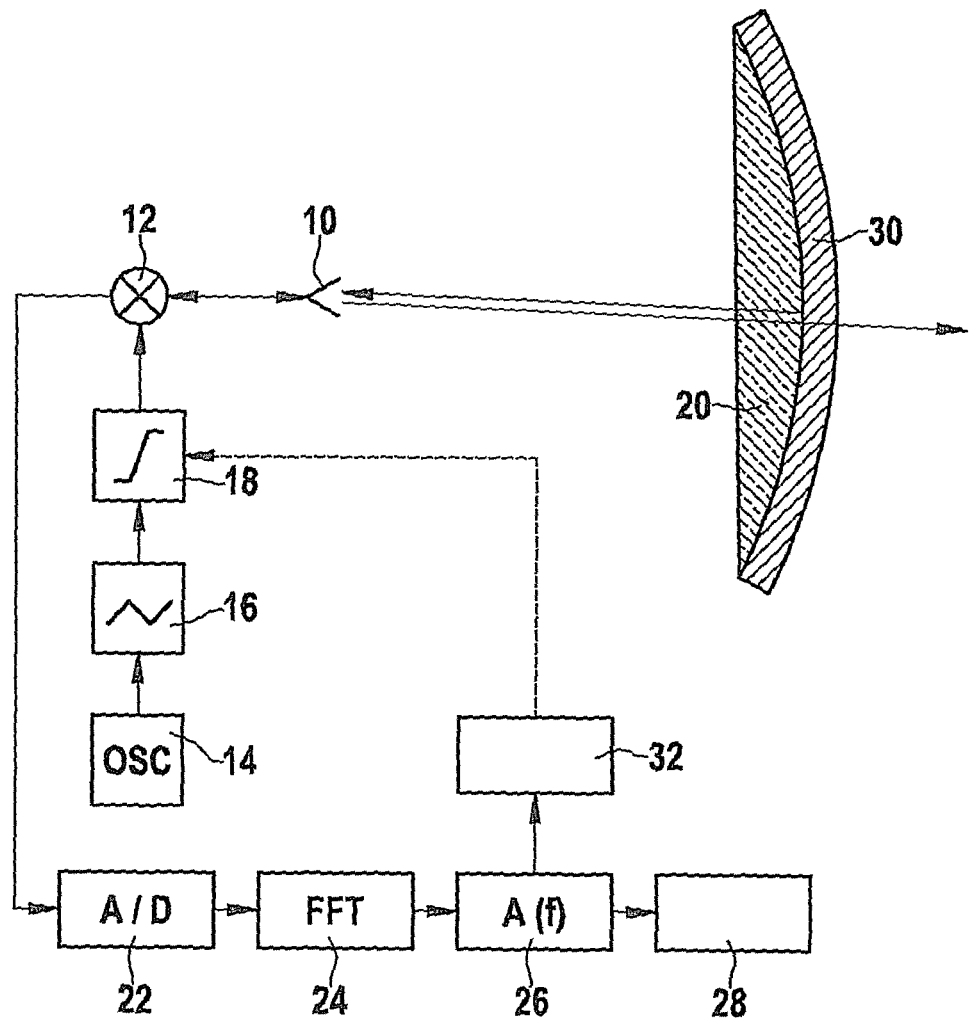
FIG. 1 shows a block diagram of a radar locating device with which an example method according to the present invention can be executed.

The radar locating device shown in FIG. 1 has an antenna 10 to which, via a mixer 12, a transmit signal is supplied that is produced by an oscillator 14 and is frequency-modulated by a modulator 16. Moreover, FIG. 1 symbolically shows an amplifier 18 with which the power of the transmit signal can be varied. In practice, however, this power variation can also take place in the oscillator or in the modulator. The signal emitted by antenna 10 is focused by a radar lens that here forms at the same time a radome 20 that covers the antenna and thus protects the antenna against weather influences.

If an object (not shown) is located by the radar locating device, the signal reflected by the object is focused by the lens onto the same antenna 10 that emitted the transmit signal (monostatic antenna design). In mixer 12, the received signal is mixed with a portion of the transmit signal, and as a mixed product a time-dependent signal (intermediate frequency signal) is obtained that is sampled and digitized in an analog/digital converter stage 22. In a transformation stage 24, the digitized signal is converted into a spectrum 26, for example using fast Fourier transformation (FFT), the spectrum showing the dependence of the amplitude of the mixed product on the frequency f. In an evaluation stage 28, this spectrum is further evaluated in order to determine the distances and relative speeds of the located objects, and, if multibeam radar is used, also to determine the azimuth angle thereof.

FIG. 1 shows an exaggerated representation of a coating 30 on the surface of radome 20, for example a film of water or dirt, that reflects part of the radar radiation emitted by antenna 10 and absorbs a further part of the radar radiation that passes through. In this way, coating 30 can significantly reduce the sensitivity of the radar locating device, up to complete blinding.

For this reason, the radar locating device has a detection device 32 that enables detection of the presence of reflecting coating 30 and enables quantitative evaluation of the reflectivity of this coating. For this purpose, detection device 32 evaluates spectrum 26, as is described in more detail in the following.

Figure 2:
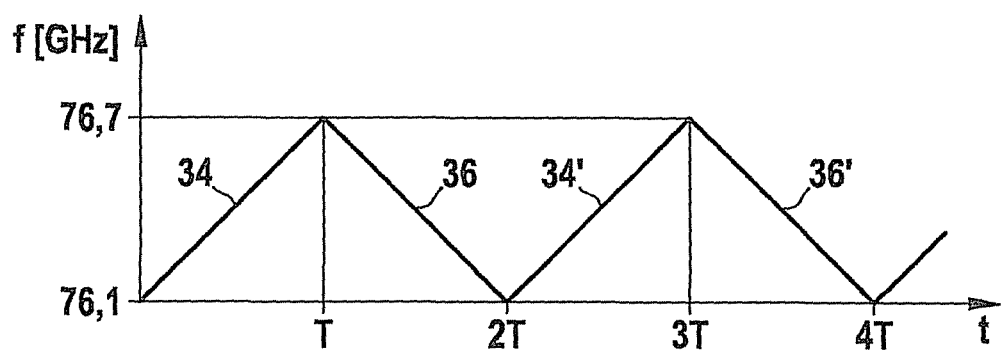
FIG. 2 shows a frequency/time diagram of a transmit signal.

The transmit signal is modulated by modulator 16 in ramp-shaped fashion, with an alternating sequence of rising and falling modulation ramps 34, 36, 34', 36', as shown in FIG. 2. These modulation ramps each have a duration T (e.g. 2 ms) and a modulation amplitude of e.g. 0.6 GHz.

Figure 3:
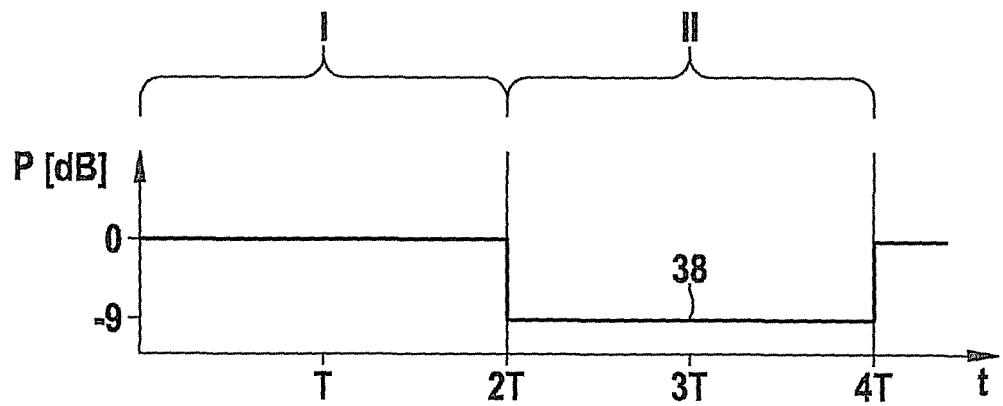
FIG. 3 shows a power/time diagram of the transmit signal.

Modulation ramps 34 and 34' have identical modulation (identical slope and duration of the modulation ramp), and the same is also true of modulation ramps 36 and 36'. However, amplifier 18 is controlled by detection device 32 in such a way that the transmit signal is emitted to ramps 34' and 36' with a lower transmit power than to ramps 34 and 36. This is shown in FIG. 3, where ramps 34 and 36 are combined to form a period I, and ramps 34' and 36' are combined to form a period II. Curve 38 in FIG. 3 shows that the transmit power during period II is lower by 9 dB than during period I. This schema is cyclically repeated in the following periods.

In another specific embodiment, the modulation ramps can also occur in the sequence 34-34'-36-36'. The transmit power then changes according to each individual modulation ramp. This has the advantage that the influence of the dynamics of "real" objects (passenger vehicles, trucks) is more strongly suppressed.

Figure 4:
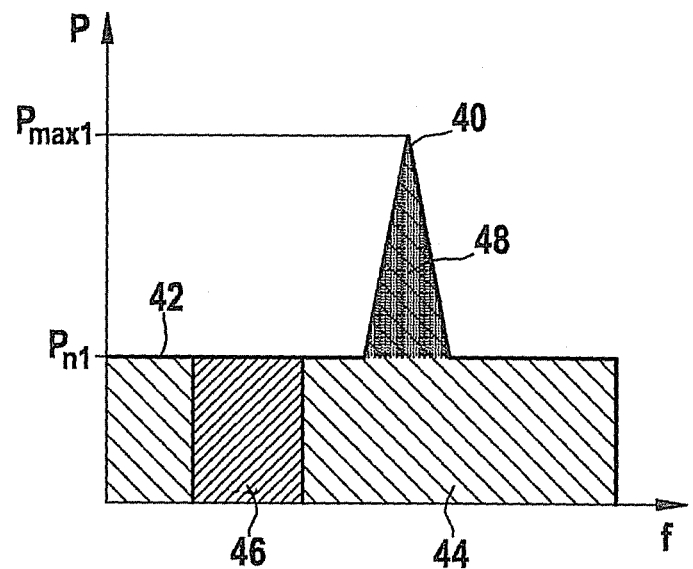
FIGS. 4 and 5 show spectra of object location signals at different transmit power levels.

Spectrum 26 is newly recorded for each of the modulation ramps 34, 36, 34', and 36', so that within each period (I or II) two spectra are obtained. FIG. 4 shows as an example a spectrum obtained on modulation ramp 34 when a single object is situated in the location range of the radar sensor. This object can be recognized in the spectrum as a peak 40 that stands out clearly from noise background 42. The power of the received signal at the apex of peak 40 has value $P_{max1}$, while the noise level, which is here assumed to be frequency-independent as a simplification, has value $Pn_1$.

Figure 5:
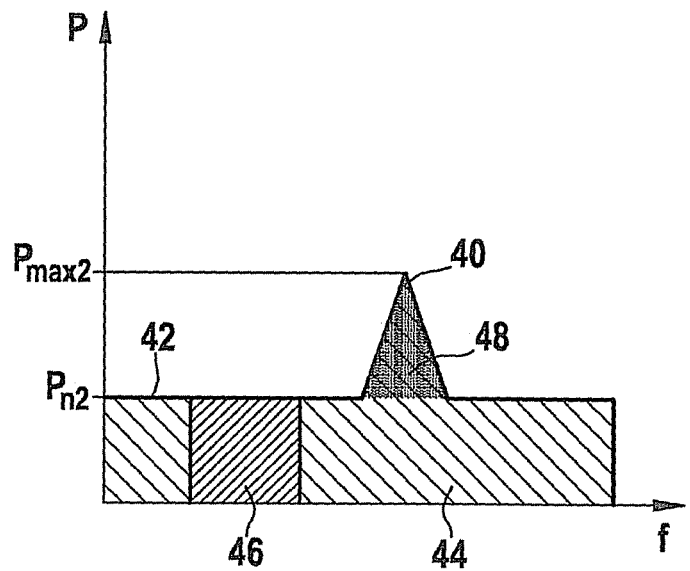

FIG. 5 shows the spectrum recorded in the same situation in the immediately following cycle (cycle II) on modulation ramp 34'. Due to the reduced transmit power, both the level of the apex of peak 40 and the noise level have decreased, to the values $P_{max2}$ and $P_{n2}$ respectively. However, the reduction of the transmit power does not cause a proportional decrease in the received power over the entire frequency range of the spectrum, but rather has the result that, as the thickness of coating 30 on the radome increases, peak 40 more and more "disappears into the noise," i.e., the signal/noise ratio becomes worse.

In order to quantify this reaction of the received signal to the change in the transmit power, in the depicted example for each of the two spectra according to FIGS. 4 and 5 the total received transmit power is integrated over a relatively large subarea of this spectrum (but with the exception of the extreme close area). Overall power $P_{tot1}$ obtained in this way is represented in FIG. 4 by area 44 drawn in with coarse hatching. The index "1" in $P_{tot1}$ indicates the period in which the modulation ramp is situated for which the spectrum was recorded; here this is therefore period I. Correspondingly, area 44 in FIG. 5 represents the total power $P_{tot2}$ on modulation ramp 34' in period II.

In addition, in both spectra the average noise power $P_{N1}$ or $P_{N2}$ is determined. For this purpose, integration is performed in the spectrum over a particular smaller frequency region within which there is no peak. In FIGS. 4 and 5, this region is indicated by an area 46 drawn with fine hatching. The average noise power $P_{N1}$ or $P_{N2}$ is obtained by normalizing the integral corresponding to area 46 to the entire frequency region over which integration was also carried out in the calculation of $P_{tot1}$ and $P_{tot2}$.

The determination of $P_{N1}$ or $P_{N2}$ described above does not need to be performed constantly during travel. It is sufficient for these values to be measured once at the factory before the radar sensor is commissioned.

If the average noise power $P_{N1}$ or $P_{N2}$ is subtracted from the overall power $P_{tot1}$ or $P_{tot2}$, signal power levels $P_{S1}$ and $P_{S2}$ are obtained, i.e., the power levels that are associated specifically with peaks 40 that stand out above noise level 42, symbolized in FIGS. 4 and 5 by dark-colored areas 48.

Through a one-time measurement of the radar locating device before installation in the vehicle, or through a training phase during driving operation, the noise level and therewith the average noise power levels $P_{N1}$ and $P_{N2}$ can be determined. In this way, it is also possible to determine the ratio a between these noise power levels, defined by the equation $$P_{N1} = a P_{N2} \quad (1)$$

A corresponding relation can also be established between the signal power levels:

$$P_{S1} = b P_{S2} \quad (2)$$

In the absence of diffuse losses, i.e., when the radome does not have a coating on it, factor b is a property of a sensor and is thus known, or is to be learned during travel if necessary. The ratio of the transmit powers is selected such that the condition $$a \neq b \quad (3)$$

is met.

Under this condition, there are now various possibilities for calculating a measure for the losses in sensitivity caused by coating 30 on the radome from the power characteristics of the received signals.

A first possibility is to evaluate the ratio of the overall power levels:

$$P_{tot1}/P_{tot2} = (P_{S1}+P_{N1})/(P_{S2}+P_{N2}) = (bP_{S2}+aP_{N2})/(P_{S2}+P_{N2}) \quad (4)$$

In the absence of diffuse losses, in particular the absence of a coating on the radome, the signal/noise ratio will be very high both in period I and in period II ($P_{S1} \gg P_{N1}$ and $P_{S2} \gg P_{N2}$), and the overall power ratio in equation (4) will be close to the value b. As the blinding of the locating device increases, the signal/noise ratio becomes worse, and when the blinding is complete ($P_{S2}=0$) the ratio in equation (4) will finally assume the value a.

The ratio $R = P_{tot1}/P_{tot2}$ thus provides an indicator of the sensitivity of the radar locating device. For example, a quality parameter Q can be defined:

$$Q = |R-a|/|b-a| \quad (5)$$

Parameter Q varies between 0 and 1, where a value close to 1 indicates high sensitivity and a value of zero indicates complete blinding of the locating device. Thus, if parameter Q stays for a long time below a particular threshold value, or falls below such a threshold value after suitable temporal filtering, detection device 32 can output a signal that indicates the blinding of the locating device.

A second possibility for obtaining a measure of the blinding of the locating device is to determine the relative power ratio between the signal power and the noise power, i.e. the evaluation of the quotients $P_{S1}/P_{N1}$ and $P_{S2}/P_{N2}$.

From Equations (1) and (2) there follows:

$$P_{N1} = a \cdot (b \cdot P_{tot2} - P_{tot1})/(b-a) \quad (6)$$

$$P_{S1} = b \cdot (P_{tot1} - a \cdot P_{tot2})/(b-a) \quad (7)$$

From these, for the power ratios there follows:

$$P_{S1}/P_{N1} = (b/a) \cdot [(P_{tot1} - a \cdot P_{tot2})/(b \cdot P_{tot2} - P_{tot1})] \quad (8)$$

$$P_{S2}/P_{N2} = [(P_{tot1} - a \cdot P_{tot2})/(b \cdot P_{tot2} - P_{tot1})] \quad (9)$$

If the sensor is not blind ($P_{S1} \neq 0$ and $P_{S2} \neq 0$), the two power ratios in Equations (8) and (9) both differ from zero, and they differ from one another by the factor b/a. In the case of blinding, in contrast, both power ratios go to zero.

Figure 6:
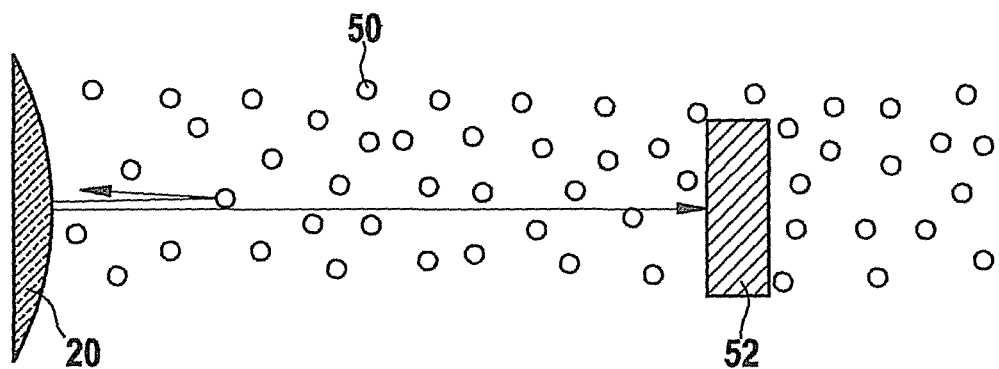
FIG. 6 shows a sketch for the detection of precipitation.

Detection device 32 in FIG. 1 is also capable of detecting impairments of the sensitivity of the radar locating system that are caused not by a coating on radome 20 but by precipitation (rain) or spray. FIG. 6 illustrates the effect of raindrops 50 in a zone between radome 20 of the radar locating device and a located object 52. As is symbolized by arrows, the radar radiation is reflected not only by object 52 but also by individual raindrops 50, causing an attenuation of the signal that reaches object 52 and, after reflection, returns to the radar sensor.

The method for detecting the precipitation is also based on a variation of the transmit power in successive modulation ramps.

Figure 7:
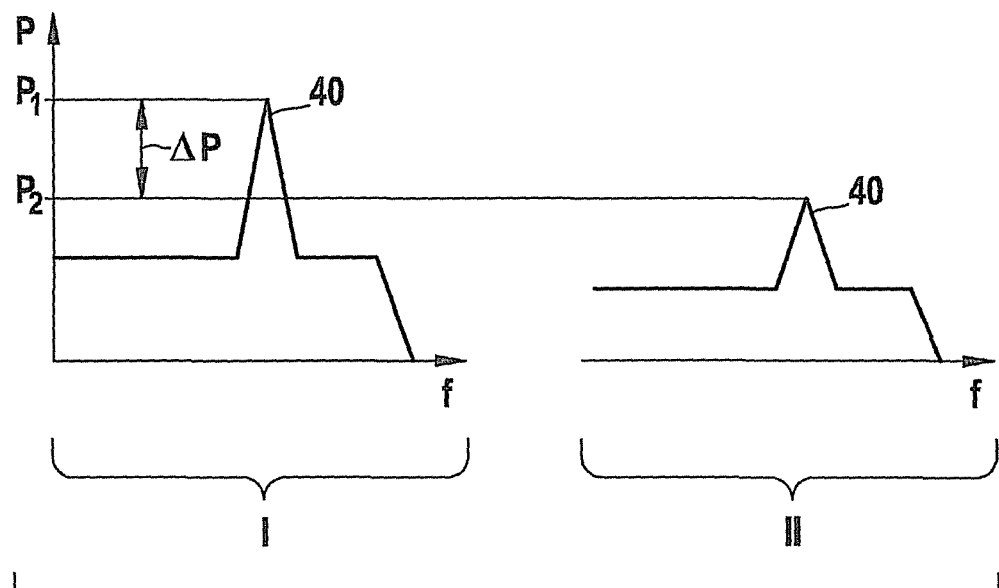
FIG. 7 shows a graphic image defining the term "difference in signal power level."

Similar to FIGS. 4 and 5, FIG. 7 shows spectra that were obtained in two successive modulation ramps with identical modulation, for example modulation ramps 34 and 34'. As an example, it was again assumed that a single object is situated in the location area, recognizable in the spectrum as a peak 40. In period I (at left in FIG. 7), peak 40 has maximum signal power $P_1$ at the apex frequency. In period II (at right in FIG. 7), in contrast, due to the decrease in the transmit power peak 40 has only the smaller maximum signal power $P_2$. If no precipitation and no other diffuse losses are present, the difference $\Delta P$ between signal power levels 21 and 22 should be a function only of the decrease in power, and should therefore retain an essentially constant value if the relevant object is followed over a plurality of successive cycles or, more precisely, pairs of cycles with alternating increased and decreased transmit power. This assumption is justified because in practice the duration of a single cycle is for example only 4 ms, and a real object, such as a vehicle traveling in front, has a relatively small dynamic characteristic, so that within a time span of a few milliseconds, or a few tens of milliseconds, practically speaking the apex level of peak 40 should not change.

In contrast, when there is precipitation the situation is different. In FIG. 6, each of the drops 50 acts as a small reflection target or object that leaves behind a small peak in the spectrum according to FIG. 7. These peaks are scattered over a wide frequency band, and, as so-called rain clutter, contribute to the background of the spectra in FIG. 7, but only up to a particular frequency limit that corresponds to the largest distance at which a radar echo from the individual raindrops is still detectable (in practice, this is approximately 10 m). Beneath this frequency limit, the rain clutter causes strong signal fluctuations due to the high vertical dynamic characteristic of the raindrops.

However, these fluctuations are as such not a suitable measure for the presence of precipitation, because they are a function not only of the precipitation but for example also of the reflection strength of the relevant object 52.

If, in contrast, signal power difference ΔP is considered, in the absence of precipitation this value should be essentially constant. The high relative dynamic of raindrops 50 in the vertical direction at close range however also causes, already in the time interval of 4 ms that is present between modulation ramps 34 and 34', a significant statistical fluctuation of signal power level difference ΔP. The scatter or variance of signal power level difference ΔP is therefore a suitable measure for the presence of precipitation.

FIGS. 8 through 11 show the results of trial measurements illustrating this effect.

Figure 8:
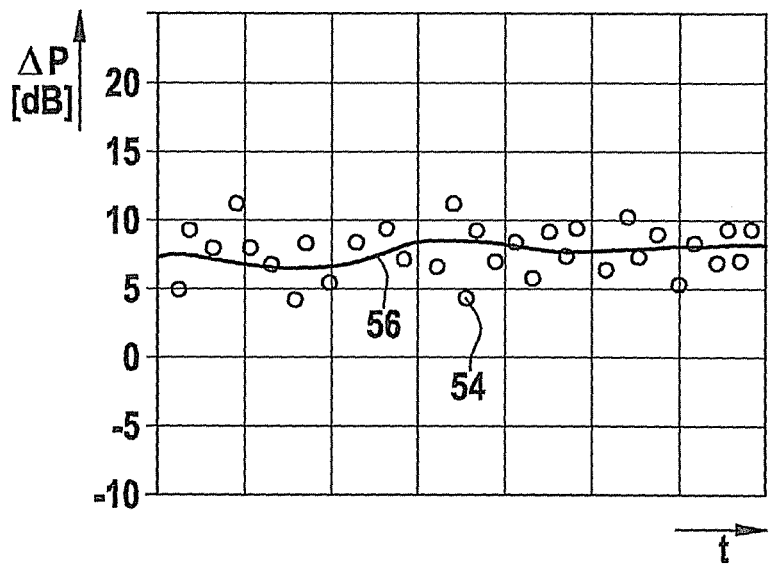
FIG. 8 shows a time diagram for measurements of the signal power level difference under conditions where no precipitation is present.

The trial measurements each extended over a time span of approximately 10 minutes. FIG. 8 shows the results of some individual measurements of signal power level difference ΔP within this time span, plotted over time t. Each individual measurement is represented here by a measurement point 54 that indicates the signal power level difference ΔP between two successive cycles. Curve 56 in FIG. 8 indicates the mean value formed by low-pass filtering of the individual measurements (with a suitable time constant).

The results illustrated in FIG. 8 were recorded during a dry measurement, i.e., only object 52 was detected and no precipitation was present.

Figure 9:
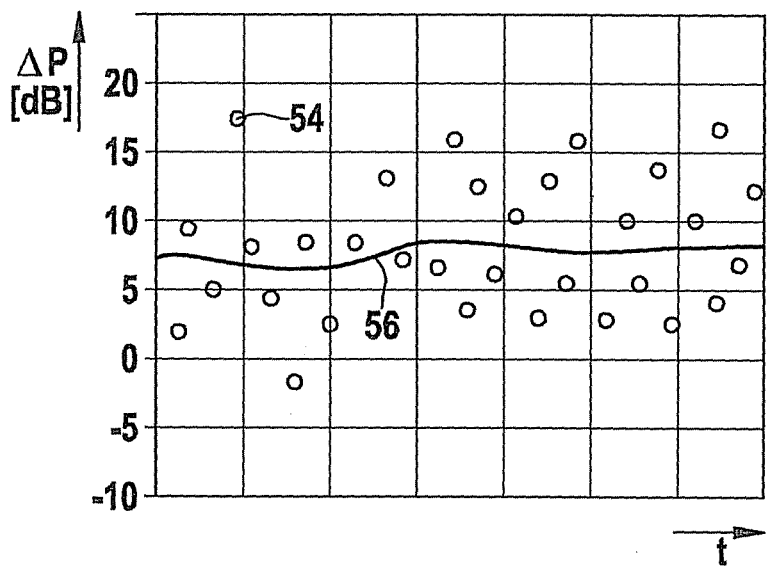
FIG. 9 shows a time diagram for measurements of the signal power level difference when precipitation is present.

In contrast, FIG. 9 shows the corresponding results for a measurement in the presence of precipitation. It will be seen that the precipitation has practically no influence on the average signal power level difference (curve 56), but results in a significantly stronger scatter of the individual measurements symbolized by measurement points 54. This scatter or variance therefore forms a usable measure for the detection of precipitation and for the quantitative determination of the strength of the precipitation.

If a sequence of successive individual measurements is considered in which k is the index of the individual measurements, the variance can be determined for example according to the following formula:

$$\sigma_k^2 = a(\Delta P_k - \text{AVE}(\Delta P_k))^2 + (1-a)\cdot\sigma_{k-1}^2 \quad (10)$$

where $\sigma_k^2$ is the estimated variance of the signal power level difference for individual measurement k, a is a filter coefficient, $\Delta P_k$ is the result of the current individual measurement, and $\text{AVE}(\Delta P_k))$ is the estimated mean value of the signal power difference for individual measurement k.

As estimated mean value $\text{AVE}(\Delta P_k))$, the low-pass-filtered value can be used that is indicated by curve 56 in FIGS. 8 and 9. A suitable value for filter coefficient a is for example 0.05.

Figure 10:
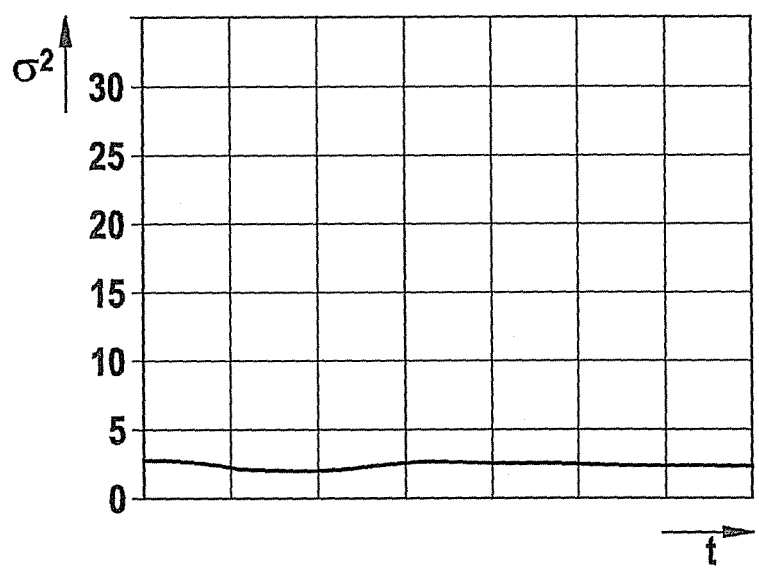
FIGS. 10 and 11 show diagrams of the variances of the signal power level differences in FIGS. 8 and 9.
Figure 11:
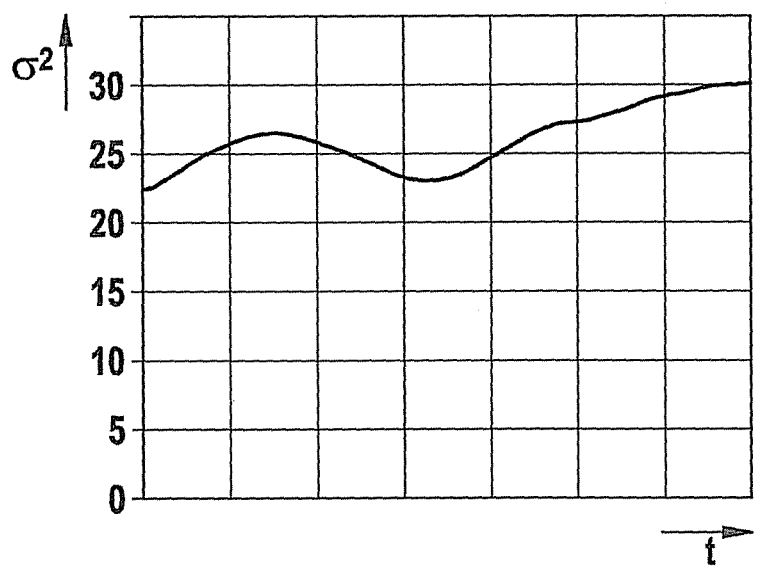

FIGS. 10 and 11 show the temporal gradient of variance $\sigma^2$ according to Equation (10) for the dry measurement corresponding to FIG. 8, or the measurement in the presence of precipitation corresponding to FIG. 9. It will be seen that in the rain measurement according to FIG. 11 the variance very quickly settles at a level that is significantly higher than the level of the variance for a dry measurement (FIG. 10).

If variance $\sigma^2$ exceeds a suitable threshold value, detection device 32 can output a signal that indicates a high level of precipitation and a corresponding impairment of the sensitivity of the radar sensor.

An advantage of the example method described here is that the detection of precipitation is possible even, and in particular, in the presence of extended objects 52 such as vehicles traveling in front and the like. A high density of objects also does not limit the applicability of this method.

In all exemplary embodiments described here, the power of the transmit signal is varied cyclically, and for the recognition of, the losses of sensitivity power characteristics are chosen that react in a sensitive manner to the change in the transmit power, but react in a less sensitive manner to disturbing factors such as temperature or aging of the radar sensor and the like. The evaluation of the power characteristics should preferably take place for modulation ramps for which the transmit power was different but that are temporally as close together as possible, so that the dynamics of located objects can practically have no influence on the power characteristics.

If, for example, a measurement cycle includes two or more different modulation ramps, it is useful to modify the transmit power after each measurement cycle.

While according to FIG. 3 a change takes place only between two transmit power levels, in general a change between three or more transmit power levels is also possible. On the other hand, the change in the transmit power need not necessarily take place after each measurement cycle. For example, it can be sufficient, after a plurality of measurement cycles with constant transmit power, to insert a single measurement cycle in which the transmit power is decreased. Likewise, it is also possible to occasionally shut off detection device 32 and to activate it only at certain intervals; here the detection device then controls amplifier 18 in such a way that the system goes into a specific blindness mode in which the modulation and the decrease in power of the transmit signal are optimized with regard to blindness recognition, or the recognition of diffuse sources of loss.

While in the depicted example spectrum 26 is evaluated, in a modified specific embodiment it is also possible in a corresponding manner to evaluate the time signal obtained in analog/digital converter stage 22.

What is claimed is:

1. A method for detecting losses of sensitivity of an FMCW radar locating device due to diffuse sources of loss, in which the radar locating device emits a transmit signal whose frequency is periodically modulated in successive modulation ramps, and at least one power characteristic of at least one frequency portion of a signal received by the radar locating device is evaluated, the method comprising:

varying cyclically power of the transmit signal, in each case, after completion of a modulation ramp; and determining the loss of sensitivity on the basis of differences in power characteristics of signals received at successive modulation ramps.

2. The method as recited in claim 1, wherein the power characteristics that are evaluated in order to detect losses of sensitivity include overall signal power $P_{tot1}$, $P_{tot2}$.

3. The method as recited in claim 1, wherein the power characteristics that are evaluated in order to detect losses of sensitivity include signal power and noise power.

4. The method as recited in claim 2, wherein transmit power is switched between two power levels, and a ratio b of these power levels is selected such that it differs from a ratio a of noise powers corresponding to the two power levels.

5. The method as recited in claim 4, wherein presence of a loss of sensitivity can be recognized in that a ratio $P_{tot1}/P_{tot2}$ is close to the ratio a.

6. The method as recited in claim 5, wherein the ratio $P_{tot1}/P_{tot2}$ in successive measurement cycles is subjected to a temporal filtering.

7. The method as recited in claim 1, wherein for a located object, a signal power difference is determined between a signal power at high transmit power and a signal power at low transmit power, and for successive cycles of the variation of the transmit power a variance of the signal power difference is determined as a measure for sensitivity losses due to precipitation.

8. The method as recited in claim 7, wherein variances in successive measurement cycles are subjected to a temporal filtering.

* * * * *